Feb. 11, 1969 L. W. MARSH, JR., ET AL 3,427,470

MULTIPLE LEVEL LOGIC CIRCUITS

Filed Aug. 11, 1965

INVENTORS
LYNN W. MARSH, JR.
FREDERICK F. LADD, JR.

BY *Kenway, Jenney & Hildreth*

ATTORNEYS

United States Patent Office 3,427,470
Patented Feb. 11, 1969

3,427,470
MULTIPLE LEVEL LOGIC CIRCUITS

Lynn W. Marsh, Jr., Marblehead, and Frederick F. Ladd, Jr., Newbury, Mass., assignors, by mesne assignments, to Mohawk Data Sciences Corporation, East Herkimer, N.Y., a corporation of New York Filed Aug. 11, 1965, Ser. No. 478,802
U.S. Cl. 307—215 7 Claims
Int. Cl. H03k 19/34, 19/36

Our invention relates to electronic logic circuits, and more particularly to a novel combination of logic circuits for performing multiple level logical operations.

Logical operations performed in computing and other data processing operations are commonly described in terms of combinations of the logical operations AND, OR and inversion. These individual operations may be performed by conventional AND gates, OR gates, and inverters, and any logical function, however complex, can be performed by interconnecting a suitable number of these components in the proper combination. In the simplest embodiments, the AND and OR functions may be performed by combinations of diodes, but in practice complex circuits are not made up with diodes alone because the losses in signal levels encountered when a number of diode levels of logic are connected in series become uneconomical and impractical. Thus, transistors are commonly employed, not only in inverter circuits, but in AND and also in OR circuits. So far as is known, true AND gates comprising less than two transistors per gate are not practical for use in complex high speed digital circuits. More economical circuits are the well known NAND and NOR circuits, which commonly comprise diode gates followed by transistors used to regenerate the desired signal levels, provide isolation, and thereby permit large numbers of levels of logic to be connected together without loss of reliability or high current demands. However, in contrast with the true AND gate, these circuits inherently provide inversion as well as the desired logic function. Thus, when connected in multiple level circuits, it is frequently necessary to add inverters simply to remove unwanted inversion in the logical process being performed. Each inverter thus added inherently reduces the speed of the system and increases its cost. The objects of our invention are to simplify the construction of multiple level logic circuits and to increase the speed of circuit complexes as embodied in systems.

Briefly, a multiple level logic circuit in accordance with our invention comprises at least three levels of gates, each level consisting of gates of the same kind and selected from the class consisting of NOR gates and NAND gates. If the first level of gates comprise NAND gates, all succeeding odd levels will also comprise NAND gates and the intervening even levels will consist of NOR gates. If the first gates are NOR gates, all other odd levels will consist of NOR gates and the intervening even levels will consist of NAND gates. As the most direct application of such circuits, multiple level equivalent OR or equivalent AND circuits may be made in this manner, without the inclusion of intermediate inverters. As is known, whether a particular circuit acts as a NAND gate or a NOR gate depends on the convention used to describe the inputs. Thus, a given multiple level logic circuit in accordance with our invention would be an equivalent AND or an equivalent OR circuit depending upon whether positive or negative logic conventions were employed. For simplicity in the following description, the positive convention will be adopted in which a logic 1 is represented by a voltage more positive than ground and a logic 0 is represented by ground potential.

The logic circuits of our invention will best be understood in the light of the following detailed description, together with the accompanying drawings of preferred embodiments thereof.

Figure 1:
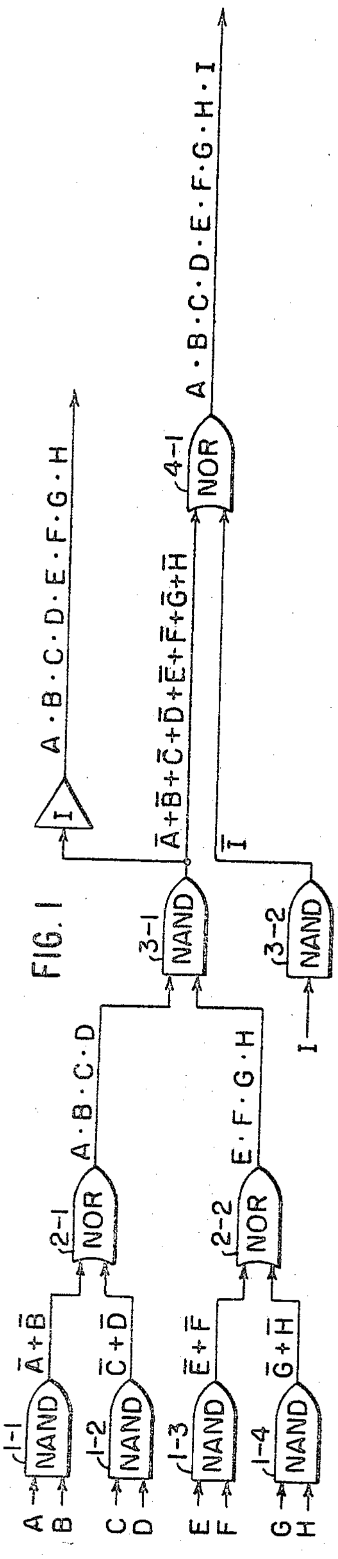
FIG. 1 is a schematic wiring diagram of a multiple level AND circuit in accordance with our invention.

Referring first to FIG. 1, we have shown a typical "fan-in" circuit in accordance with our invention for use as an equivalent AND circuit, one portion of the apparatus providing an AND circuit for producing a positive output signal when eight input leads A, B, C, D, E, F, G and H are each at a positive level, and also incorporating means for providing a positive output signal when each of the first group of input leads is at a positive level and an additional input lead I is also at that level. It will be apparent to those skilled in the art that these functions could be accomplished logically by an eight or a nine input terminal AND gate, respectively. However, as is well known in the art, considerations of current consumption, input impedance and economics put practical limits on the number of input terminals that may be connected to a single gate. For this reason, it is common to build up equivalent AND, OR, or other functions by the use of fan-in circuits consisting of several levels of gates each having two or three input terminals. The circuit of FIG. 1 accomplishes this purpose with a minimum of inverters that perform no function other than inversion, and thus produces the desired output signal with a minimum of levels. As shown, the first level includes four NAND gates 1–1, 1–2, 1–3 and 1–4 which perform the NAND function in positive logic. The gate 1–1 receives signals A and B, the gate 1–2 receives input signals C and D, the gate 1–3 receives the input signals E and F, and the gate 1–4 receives the input signals G and H. Each gate has the property that when and only when all of the input signals are positive, the output terminal will be at ground potential. When any of the input terminals are at ground potential, the output terminal will be positive. This property is indicated by labelling each output terminal to indicate the logical condition under which it is at a positive potential. Thus, the output terminal of the gate 1–1 is labelled $\bar{A}+\bar{B}$, read "A not or B not." Similarly, the output terminal of the gate 1–2 is labeled $\bar{C}+\bar{D}$, the output terminal of the gate 1–3 is labelled $\bar{E}+\bar{F}$, and the output of the gate 1–4 is labelled $\bar{G}+\bar{H}$.

The output terminals of the gates 1–1 through 1–4 are connected to the input terminals of a second level of gates, comprising two NOR gates 2–1 and 2–2. These gates perform the NOR function in positive logic. In other words, the output terminal of each gate will be at a positive potential when and only when both of the input terminals are at ground potential. This property is indicated in FIG. 1 by the notation A·B·C·D on the output lead of the gate 2–1, read "A and B and C and D" and expressing the condition under which the output terminal will be at a positive potential. The output terminal of the gate NOR 2–2 is similarly labelled E·F·G·H, to indicate the logical condition under which it is at a positive potential.

The output terminals of the second level of gates are connected to the input terminals of a third gate level, comprising for the purpose of fanning in the leads A through H, a single NAND gate 3–1. The third level is also composed of NAND gates in positive logic. With the input signals applied, the NAND gate 3–1 will produce an output that is at ground potential when any of the input leads A through H is not positive. This condition is indicated by labelling the output lead $\overline{A}+ \ldots +\overline{H}$. In order to recover the desired AND function, this output lead may be connected to an output inverter producing the output A·B . . . H, which is positive. It will be seen that only a single output inverter is required, and this single output inverter will be required for any odd-level fan-in circuit. No such inverter is needed for even-level fan-in circuits, as indicated by the output of a fourth level NOR gate 4–1. This gate is a NOR gate in positive logic, and receives the output of the gate 3–1 and a second third level NAND gate 3–2, receiving an input signal labelled I which may be derived in a manner similar to the derivation of the outputs of the gates 2–1 and 2–2, or may be derived in any other desired manner. The NOR gate 4–1 will produce an output positive potential when all of the input leads A through I are positive.

Figure 2:
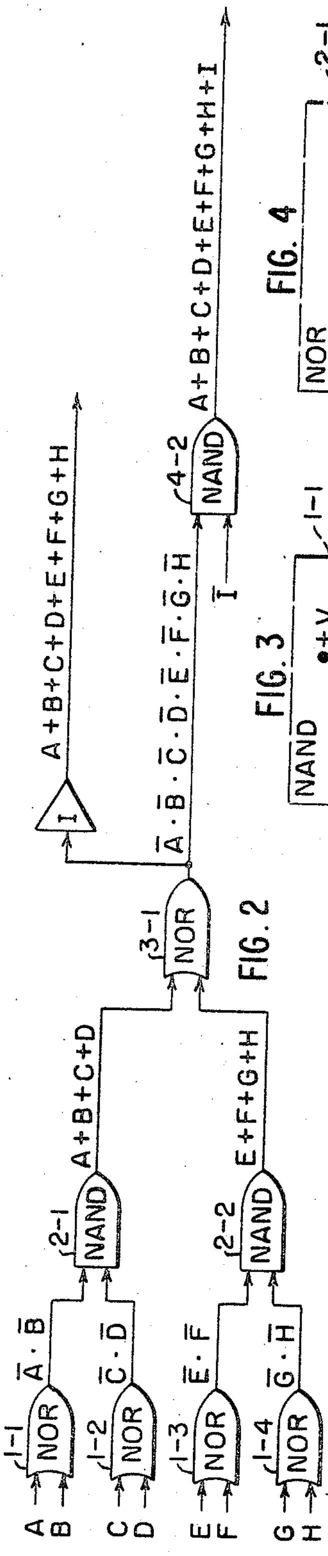
FIG. 2 is a schematic wiring diagram of a multiple level equivalent OR circuit in accordance with our invention.

FIG. 2 shows a multiple level gate serving as an equivalent OR gate when the first and succeeding odd levels are NOR gates in the logic system adopted, and the second and following even levels are NAND gates in the same logic system. Gates in similar levels are given similar reference characters corresponding to those in FIG. 1. As in FIG. 1, odd level outputs require an inverter to derive the desired OR function, whereas even level outputs such as the output of the NAND gate 4–1 produced the OR function without inversion. Labelled outputs of the various gates indicate the conditions under which the gates will be positive in positive logic.

Since the logic convention adopted determines whether a particular gate is a NOR or a NAND gate, it is convenient to employ the concept of dominance to describe the gates. A gate is said to be "0-dominant" when a logic 0 signal applied to any input terminal determines the output signal value regardless of the input signals applied to any other input terminals. A 0-dominant gate performs the NAND function. Conversely, a gate is said to be "1-dominant" when a logic 1 signal applied to any input terminal determines the output signal value regardless of the input signals applied to any other input terminal. A 1-dominant gate performs the NOR function. In its broadest aspects, a multiple level logic circuit in accordance with our invention consists of at least three levels of gates, each succeeding level comprising a gate or gates of the same dominance and opposite the dominance of the preceding level, all of the gates being either NOR or NAND gates. Members of the class of circuits thus defined are, therefore, the 1-dominant, 0-dominant, 1-dominant and the 0-dominant, 1-dominant, 0-dominant multiple level circuits.

Figure 3:
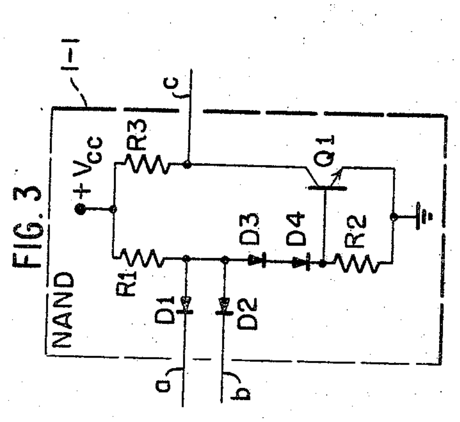
FIG. 3 is a schematic wiring diagram of one typical circuit suitable for use in the arrays of FIGS. 1 and 2.

Referring now to FIG. 3, we have shown one typical circuit suitable for use as the NAND gate in positive logic in the circuits of FIGS. 1 and 2. For identification, the NAND gate has been labelled 1–1, corresponding to the corresponding numbered element in FIG. 1, but it will be apparent that the circuit can be used for any of the other corresponding gates in FIGS. 1 and 2.

A typical NAND gate 1–1 is here shown as provided with a pair of input terminals *a* and *b* connected through conventional diodes D1 and D2 to a junction point in a potential divider. The potential divider extends from a suitable source of positive voltage +V*cc* through a resistor R1, a pair of diodes D3 and D4, and a resistor R2 to ground. The junction of the diode D4 and the resistor R2 is connected to the base of a conventional npn transistor Q1. The emitter of the transistor Q1 is grounded, and the collector is returned to the source +V*cc* through a resistor R3. The components of the circuit 1–1 may be discrete components mounted on a printed circuit board as is conventional, or may be made in the conventional manner in the form of integrated circuits.

The output terminal *c* of the NAND gate 1–1 is connected to the collector of the transistor Q1. In operation, when ground potential is applied to either or both of the input terminals *a* and *b*, the transistor Q1 will be cut off and the potential at the output terminal *c* will rise positive with respect to ground. When both input terminals *a* and *b* are at a positive potential with respect to ground, the diodes D1 and D2 will be blocked and the potential at the base of the transistor Q1 will be positive, forward-biasing the transistor Q1 to conduct to saturation and reducing the potential of the output terminals *c* essentially to ground potential. While two input terminals *a* and *b* have been shown, it will be apparent that any practical number of additional input terminals could be provided by the use of additional diodes such as D1 and D2 connected to the same junction point. Thus, the numbers of gates in the successive levels of the circuits of FIGS. 1 and 2 would not necessarily be in binary descending order, but could be in trinary, quaternary, or mixed descending order.

Figure 4:
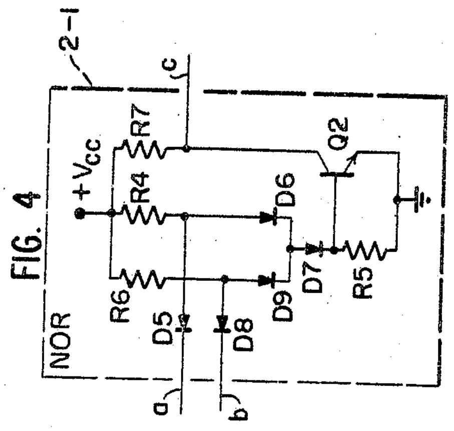
FIG. 4 is a schematic wiring diagram of a second typical circuit suitable for use in the arrays of FIGS. 1 and 2.

In the NAND circuit 1–1, the diodes D3 and D4 serve to decouple the base of the transistor Q1 from the input when the transistor is being turned off. This ensures that the energy gap in the base junction of the transistor Q1 is not exceeded over a reasonably wide range of temperatures and makes it unnecessary to return the resistor R2 to a negative power supply rather than to ground. The transistor Q1 as well as the transistor Q2, which will be described with reference to FIG. 4, are preferably of the silicon type. The diodes D3 and D4 also make the circuit 1–1 functional at higher switching speeds.

FIG. 4 shows a typical gate 2–1 for performing the NOR function in positive logic. It is shown as having two input terminals *a* and *b*; other input terminals could be provided by an obvious extension of the circuit. Each input terminal such as a is connected through a diode such as the diode D5 to a junction in a potential divider path extending from a suitable positive voltage source +V*cc* through a resistor such as R4, a diode D6, a common diode D7, and a common resistor R5, to ground. Thus, the second input terminal *b* is connected through an input diode D8 to a junction point on a potential divider extending from the positive terminal +V*cc* through the resistor R6, the diode D9, the common diode D7 and the common resistor R5 to ground. Other input terminals could be similarly connected.

The junction of the diode D7 and the resistor R5 is connected to the base of a conventional npn transistor Q2. The emitter of the transistor Q2 is grounded, and the collector is returned to the source +V*cc* through a resistor R7. As in the case of the gate 1–1, the components could be either discrete components connected together, or the whole circuit could be made by integrated circuit techniques. It will be apparent to those skilled in the art that complex circuits such as those shown in FIGS. 1 and 2 could also be made up of integrated circuits if so desired.

The output terminal *c* of the gate 2–1 is connected to the collector of the transistor Q2. In operation, if any of the input terminals such as *a* or *b* is positive with respect to ground, the base of the transistor Q2 will be biased forward with respect to the emitter, and the transistor will conduct in saturation bringing the output terminal *c* to ground potential. If all of the input terminals such as *a* and *b* are at ground potential, however, the transistor Q2 will be cut off and the output terminal *c* will go to a positive potential with respect to ground.

The diodes D6, D7 and D9 in the NOR gate 2–1 improve the switching speed of the circuit, improve the coupling efficiency, provide limiting when more than one input terminal is made positive, and also serve the logical function of isolating inputs. Specifically, suppose that the input *a* is positive and the input terminal *b* is at ground. The diodes D6 and D7 will conduct current in a forward direction, and the base of the transistor Q2 will be biased forward with respect to the emitter. The anodes of the diodes D8 and D9 will be above ground potential only by one diode gap. However, the cathode of the diode D9 will be above ground potential by at least two diodes gaps. Accordingly, the diode D9 will be reversed-biased under these conditions and isolate the second input. The provision of these diodes also makes the circuit more stable when the base resistor R5 is returned to ground, rather than to an additional negative supply voltage.

While we have described our invention with reference to the details of specific embodiments thereof, many changes and variations will be apparent to those skilled in the art upon reading our description, and such can obviously be made without departing from the scope of our invention.

Having thus described our invention, what we claim is:

1. A fan-in circuit consisting of at least three levels of gates connected in series, said levels consisting alternately of oppositely dominant gates and comprising an odd set and an even set, one of said sets consisting of NAND gates and the other of said sets consisting of NOR gates.

2. The fan-in circuit of claim 1 in which the odd levels consists of 1-dominant gates.

3. The fan-in circuit of claim 1 in which the even levels consist of 1-dominant gates.

4. A fan-in circuit for producing at a first terminal an output signal which is a predetermined logic function of the logic signals applied to a plurality of input terminals, said circuit comprising at least three logical levels of gates, a first level of said gates having input terminals connected to said input terminals and output terminals connected to the input terminals of the gates of the next level, and the last level consisting of a single gate having input terminals connected to the output terminals of the gates of the next preceding level and an output terminal connected to said first terminal, said gates consisting alternately of NAND and NOR gates in accordance with a predetermined logic convention.

5. In combination, four first level gates each having two input terminals and an output terminal, two second level gates each having two input terminals and an output terminal, the output terminals of said first level gates each being connected to a different input terminal of said second level gates, and a third level gate having two input terminals and an output terminal, the output terminal of each second level gate being connected to a different input terminal of said third level gate, wherein all odd-level gates comprise a first set, and all even-level gates comprise a second set, one of said sets consisting of NOR gates and the other of said sets consisting of NAND gates in a common logic convention.

6. A fan-in circuit for producing at a first terminal an output signal which is a predetermined logic function of the logic signals applied to a plurality of input terminals, said circuit comprising at least three logical levels of gates, a first level of said gates having input terminals connected to said input terminals and output terminals connected to input terminals of the gates of the next level, and the last level consisting of a single gate having input terminals connected to the output terminals of the gates of the next preceding level and an output terminal connected to said first terminal, said gates consisting alternately of two different types of gates, one type comprising an AND function and an inversion function, and the other type comprising an OR function and an inversion function, in accordance with a predetermined logic convention.

7. A fan-in circuit consisting of at least three levels of gates connected in series, said levels consisting alternately of oppositely dominant gates and comprising an odd set and an even set, all of said gates each comprising a transistor having an emitter, a collector and a base, a first resistor connected between said emitter and said base, and a second resistor having a first terminal connected to said collector and a second terminal, the gates of one set further comprising a third resistor having a first terminal connected to the second terminal of said second resistor and a second terminal, first and second diodes connected in series with the second terminal of said third resistor and said base and poled to conduct current in a sense biasing said transistor to conduction, a set of input terminals, and a diode connected between each input terminal and the second terminal of said third resistor and poled in opposition to said first and second diodes, and the gates of said other set further comprising a set of input terminals, a fourth resistor for each input terminal having one terminal connector to the second terminal of said second resistor and a second terminal, a third diode for each input terminal having a first terminal connected to the second terminal of a different one of said fourth resistors and a second terminal and poled to conduct current in a sense biasing said transistor to conduction, a fourth diode connected between each input terminal and the first terminal of a different fourth resistor and poled in opposition to said third diode, and a fifth diode connected between the second terminals of said fourth diode and said base and poled in alignment with said third diode.

References Cited

UNITED STATES PATENTS

| | | | |
|---|---|---|---|
| 3,178,590 | 4/1965 | Heilweil | 307—289 |
| 3,291,973 | 12/1966 | Rusche | 307—215 |

ARTHUR GAUSS, *Primary Examiner.*

R. H. PLOTKIN, *Assistant Examiner.*

U.S. Cl. X.R.

328—92